Figure 1:
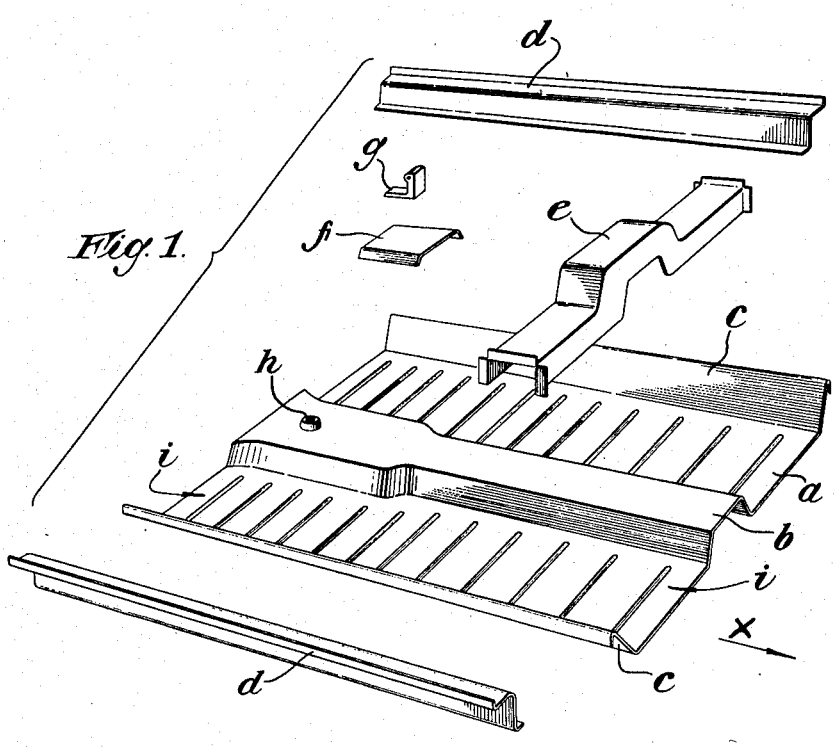

April 28, 1964 T. F. TRIBE 3,131,286
MANUFACTURING METAL STRUCTURES

Filed Oct. 2, 1961 10 Sheets-Sheet 1

Inventor
Thomas F. Tribe
By Kenyon Palmer,
Stewart & Estabrook
Attorneys

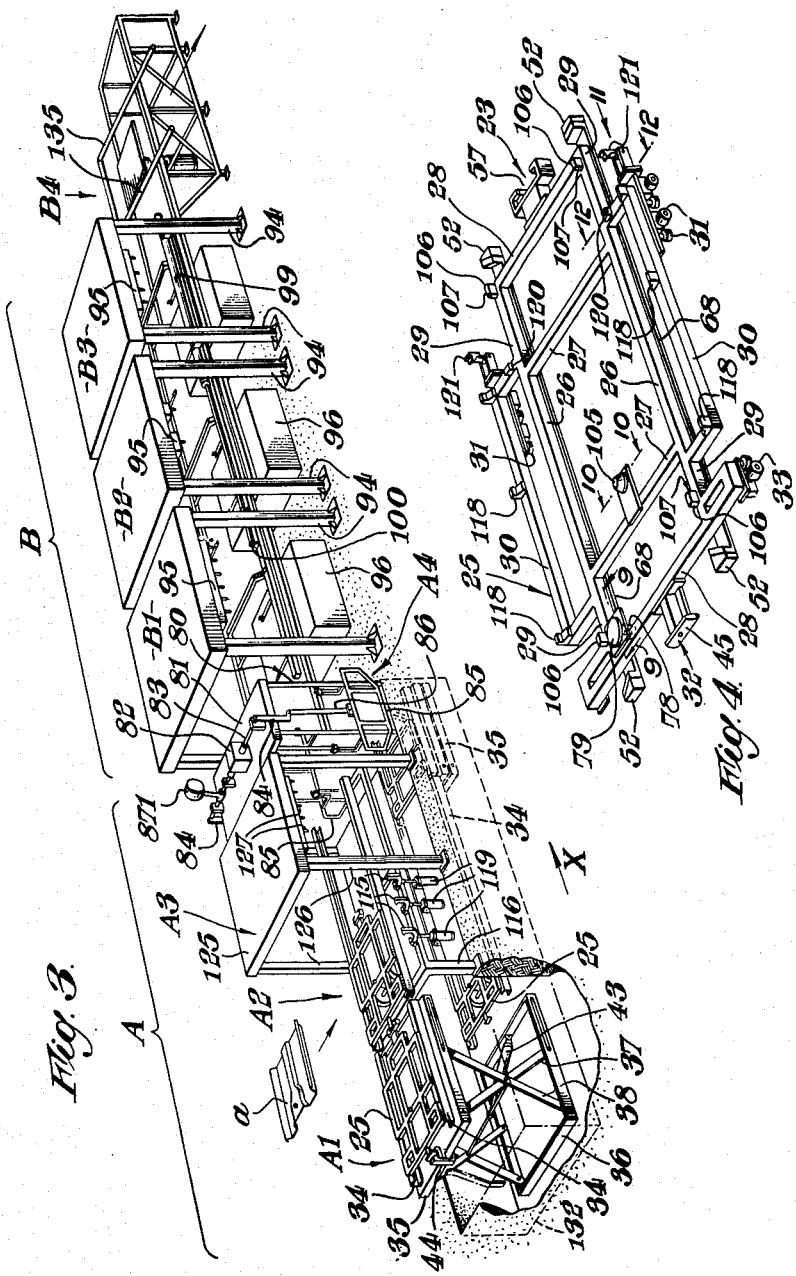

April 28, 1964     T. F. TRIBE     3,131,286
MANUFACTURING METAL STRUCTURES

Filed Oct. 2, 1961     10 Sheets-Sheet 3

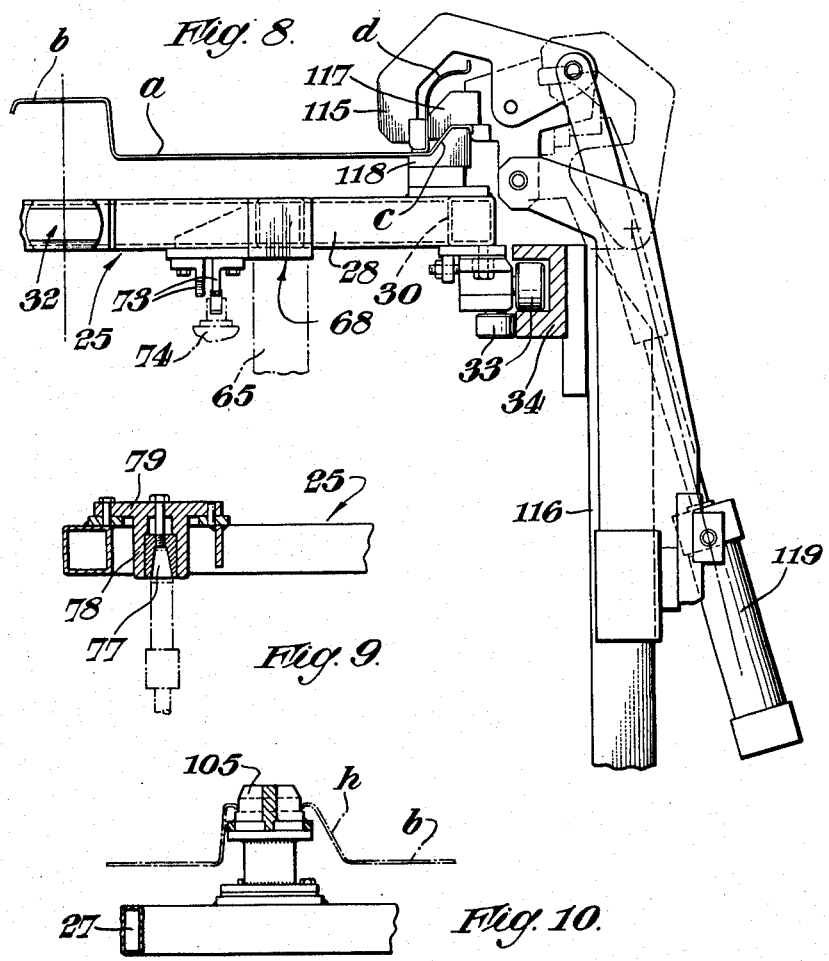

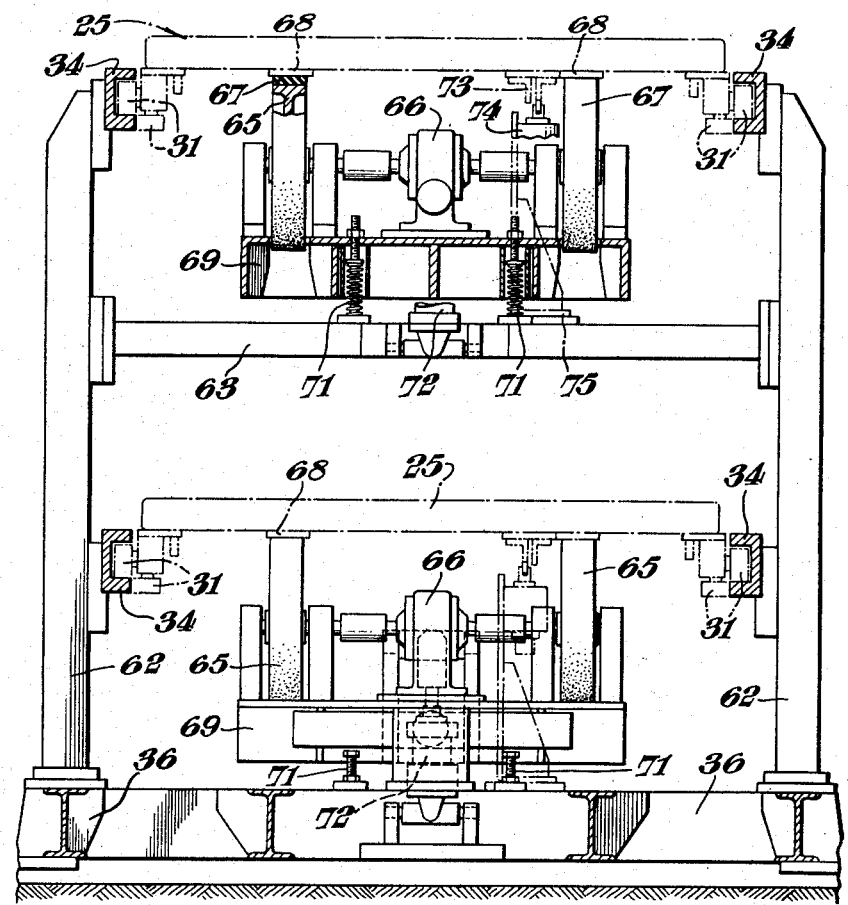
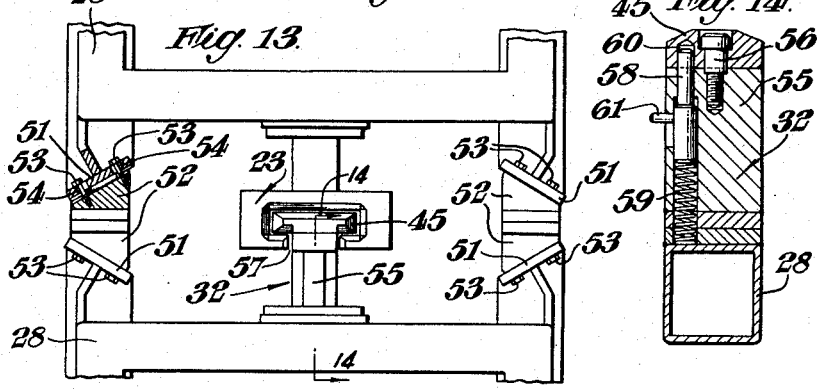

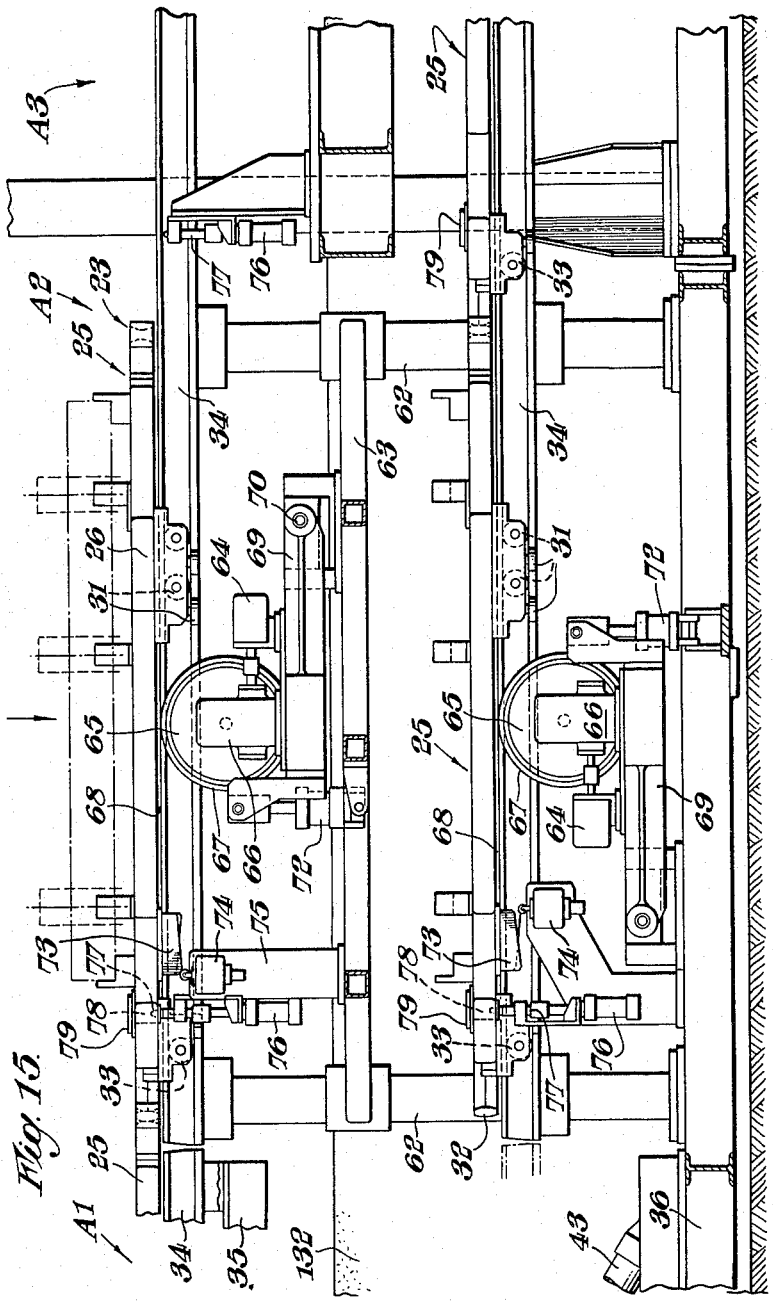

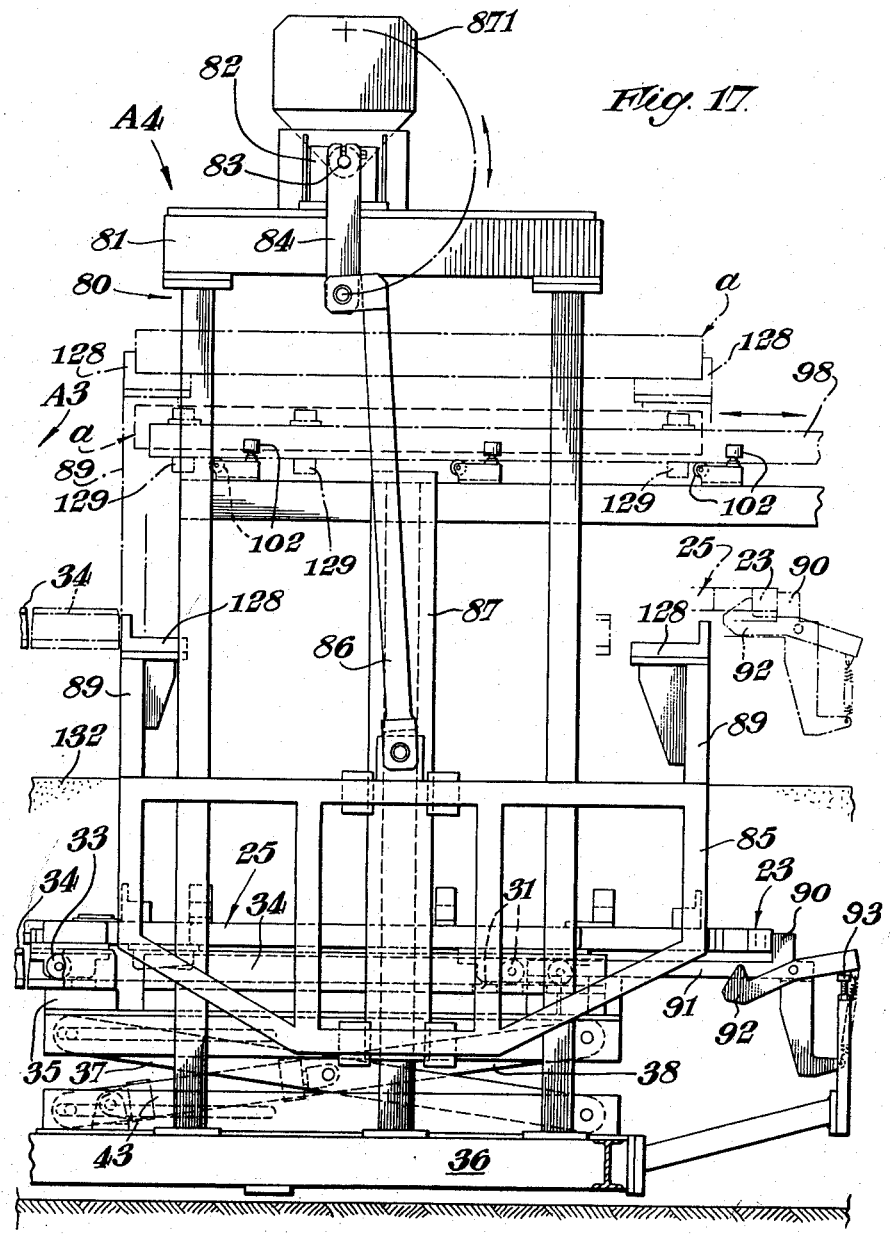

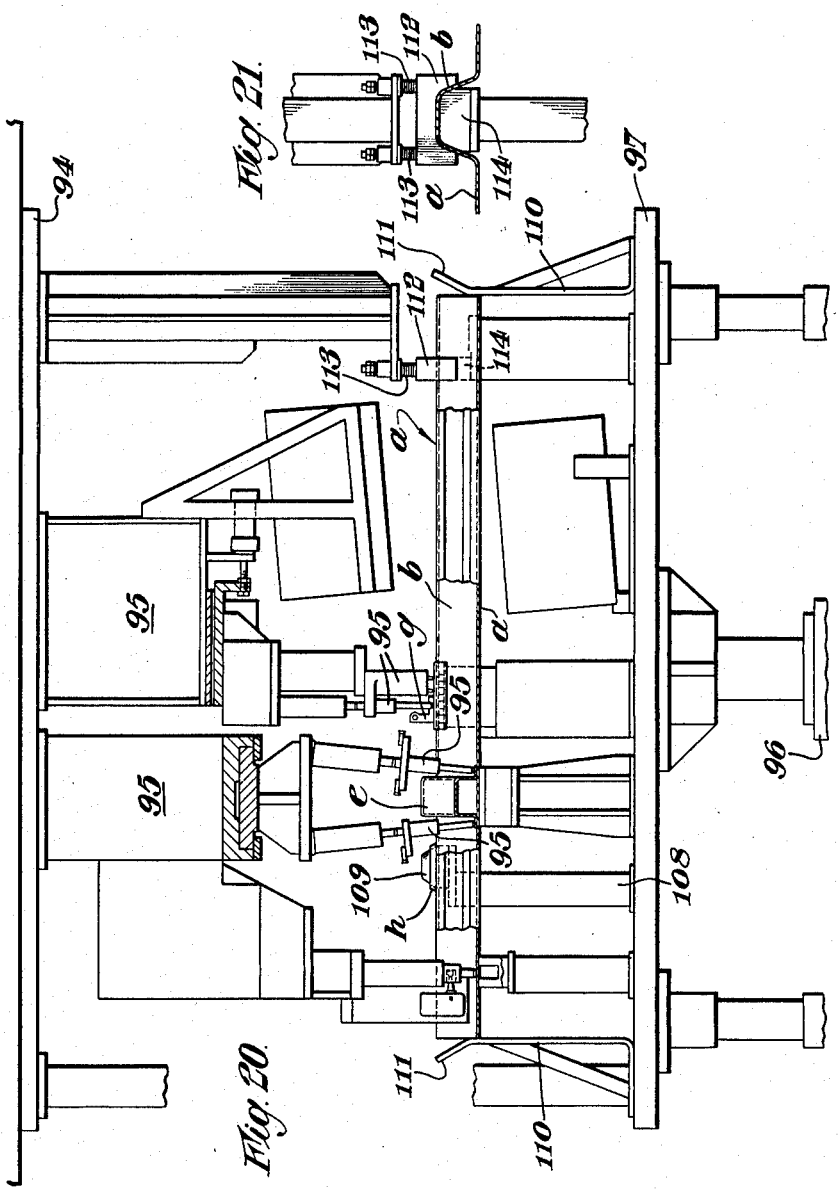

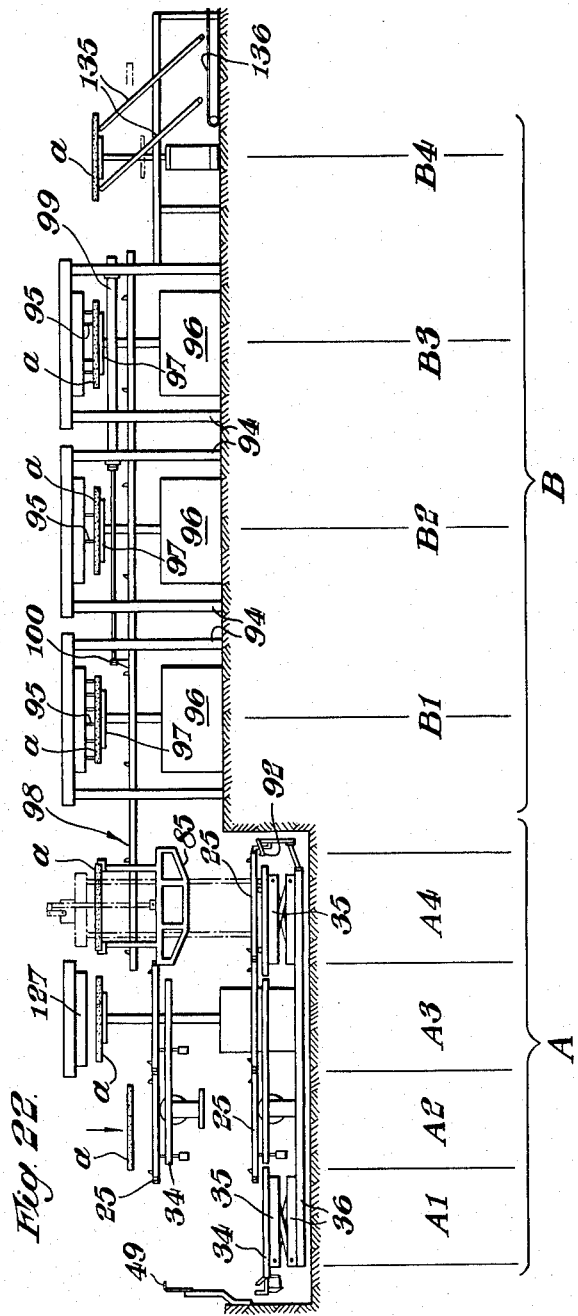

United States Patent Office 3,131,286
Patented Apr. 28, 1964

3,131,286
MANUFACTURING METAL STRUCTURES
Thomas Francis Tribe, Castle Mill Works, Dudley, Worcester, England, assignor of one-half to British Federal Welder and Machine Company Limited
Filed Oct. 2, 1961, Ser. No. 142,326
Claims priority, application Great Britain Oct. 4, 1960
9 Claims. (Cl. 219—80)

This invention concerns apparatus for manufacturing structures by uniting components of the structure and relates more particularly to sheet metal structures such, for instance, as a door or a floor panel for a road vehicle. For convenience the invention will be referred to as uniting sheet metal components by welding to form a metal structure though the invention is not so limited.

In welding sheet metal components it is a common practice to mount the components on a carriage and to move the carriage step-by-step in succession from one welding station to another at each of which the components are united. The carriage comprises one of an endless line, the carriages being moved one after another past a loading station, at which the components are successively mounted on the carriages, and the welding stations, the carriages being returned from the last welding station to the loading station.

With this arrangement it is commonly necessary to provide a large number of carriages and because the carriages pass through the support structure for the welding equipment at the welding stations the support structure must be relatively large. If the carriages returning from the last welding station to the loading station pass along a pit in the floor of the factory a relatively large excavation is required beneath the welding stations. Also because each carriage moves in succession through all the welding stations it must carry the jigs and fixtures as well as welding equipment for use at all of the stations. Consequently each carriage not infrequently becomes much elaborated as to its equipment and the cost involved when there are several welding stations may become very great.

According to this invention a method of producing structures is characterised in that the components of the structures are carried in succession by an endless conveyor (e.g., comprising carriages as referred to above) step-by-step from a loading to a transfer station past at least one station at which components are temporarily united (e.g., by tack welding) and further characterised in that the temporarily-united components are transferred at the transfer station from the conveyor to a reciprocating slide means operated in synchronism with the conveyor, the temporarily-united components being advanced step-by-step from the transfer station to an unloading station past a plurality of stations at which the components are permanently united (e.g., by resistance welding) all the components being simultaneously advanced from one station to the other by said conveyor and by said slide means. Preferably the components are all removed from the slide means when at the uniting and unloading stations and the slide means is returned to the transfer station while the components are being united and off loaded. The components at the uniting stations are preferably raised for engagement with the uniting equipment (e.g., welding).

In practice it is preferred that the endless conveyor comprise a plurality of coupled or individual carriages each having means to support the components in predetermined position thereon, the carriages moving horizontally and intermittently from the loading to the transfer station at which the tack-welded components are removed from each carriage in succession, transferred to the slide means and secured thereto while maintained in said predetermined position.

Preferably the carriages move in two horizontal paths (one above the other) between the loading and transfer stations and there is means for raising the unladen carriages from the lower to the higher path at the loading station and another means for raising the temporarily united components from the laden carriages in the higher path to the slide means and thereafter for lowering the unladen carriages from the slide means to the lower path. It is arranged that the components at the transfer station are raised simultaneously while the components are raised from the slide means.

It may be arranged that the carriages in the lower horizontal path move through a pit below ground level, the upper horizontal path being at, or near, ground level. Alternatively, however, the carriages may move along two horizontal paths arranged side-by-side and at the same level. Again it may be alternatively arranged that the carriages move along a lower horizontal path from the loading station to the transfer station at, or near, ground level and are returned to the loading station along a higher horizontal path.

The carriages at the loading and transfer stations may be raised hydraulically, mechanically or pneumatically but it is preferred that they be raised by a hydraulic jack or ram.

Figure 2:
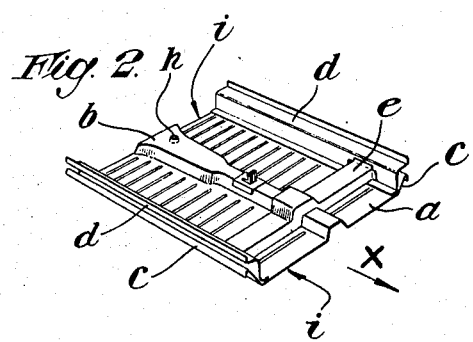
Figure 5:
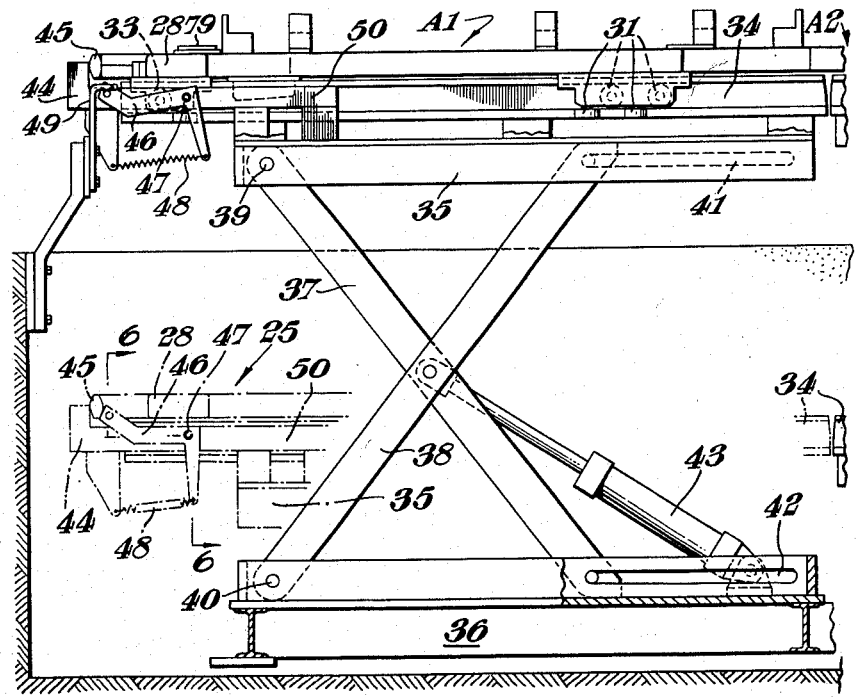
Figures 6, 7:
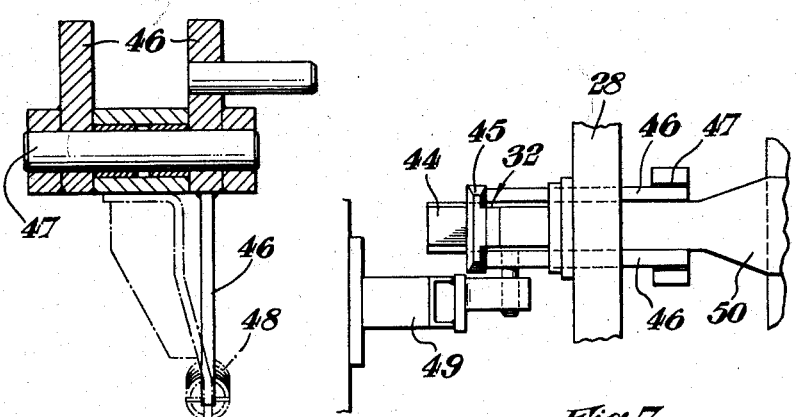
Figure 18:
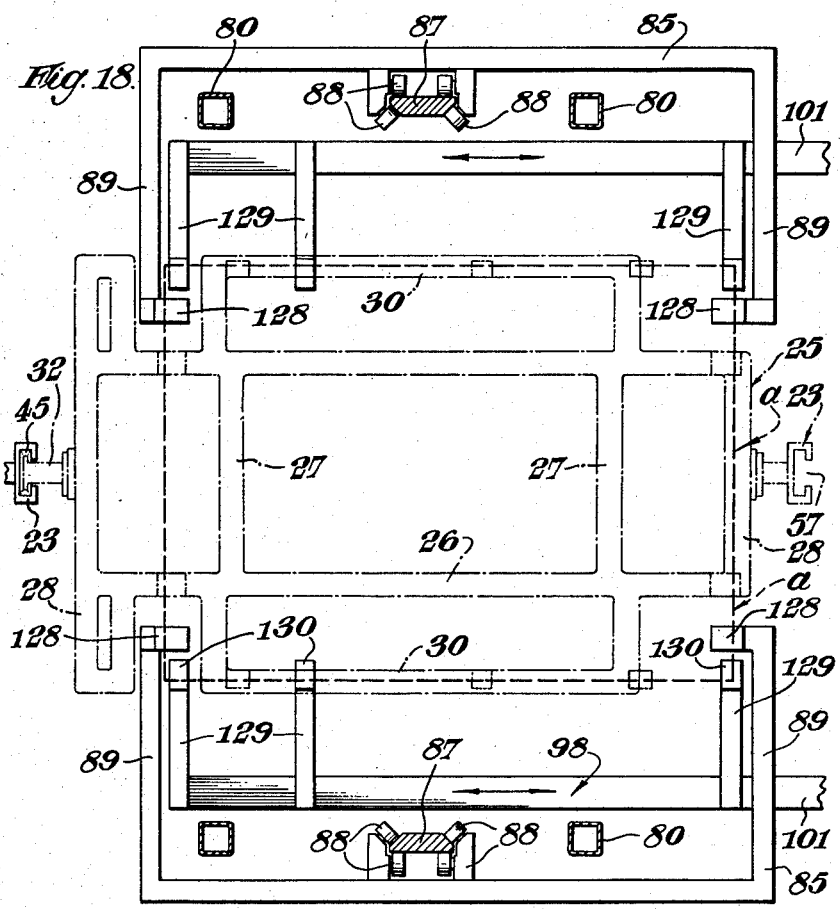
Figure 19:
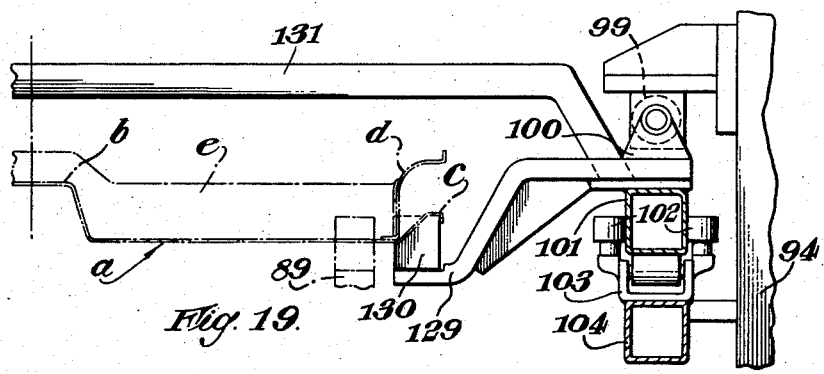

A practical application of the invention will now be described, by way of example, with reference to the accompanying drawings whereof:

FIG. 1 is an exploded perspective view of a sheet metal structure to be fabricated in the apparatus, FIG. 2 is a perspective view of the fabricated structure, FIG. 3 is a schematic view of the apparatus, FIG. 4 is a perspective view of the carriage used in the apparatus of FIG. 3, FIG. 5 is a side view of the apparatus at the loading station, FIG. 6 is a sectional view of a detail of construction of the apparatus of FIG. 5, FIG. 7 is a plan view of the device of FIG. 6, FIG. 8 is a side view of a clamping mechanism for holding certain components to the carriage of FIG. 4, FIGS. 9, 10, 11 and 12 show details of construction of the carriage, FIG. 13 is a plan view of a coupling device for joining together two carriages, FIG. 14 is a section on the line XIV—XIV of FIG. 13, FIG. 15 is a side view of a mechanism for moving the carriages through the apparatus, FIG. 16 is an end view of the mechanism of FIG. 15, FIG. 17 is a side view of the apparatus at the transfer station, FIG. 18 is a sectional plan view of the apparatus of FIG. 17, FIG. 19 is an end view showing certain details of construction of the apparatus of FIG. 18, FIG. 20 is a side view (partly in section) of the apparatus at a weld station showing the reciprocating slide means referred to above, FIG. 21 is a sectional view of a part of the apparatus of FIG. 20, and FIG. 22 is a schematic side view of the apparatus.

The particular article to be fabricated in the apparatus which is about to be described is shown in FIGS. 1 and 2 of the drawings.

The article (a sheet metal floor component for a road vehicle) comprises a rectangular panel *a* having a central tunnel *b* and a pair of opposite upstanding sides *c*. A pair of Z-section strips *d* are provided within sides *c* and, one each immediately next to the sides, as seen in FIG. 2. A channel bridge member *e* extends across panel *a* between strips *d* and over tunnel *b* while a plate *f* and bracket *g* carried thereby is secured to the top of tunnel

*b* and spaced lengthwise thereof from bridge member *e*. Bracket *g* and plate are welded to tunnel *b*, strips *d* are welded to panel *a* and member *e* is welded to panel *a* and strips *d*, all to form a rigid structure.

The top of tunnel *b* is formed, or provided, with a circular, slightly tapering (conic) button *h*—see also FIG. 10. This serves no structural function and is provided for location as will later be explained.

The sides *c* are upwardly divergent while edges *i* are parallel and normal to the sides *c*.

The several parts of the floor structure are placed upon a skeleton carriage 25 (FIG. 4) and the carriage is moved through line A of the fabricating apparatus from a loading station A1 to a transfer station A4 past stations A2 and A3 where the components are assembled and united by tack welding preparatory to transfer at station A4 to line B. The latter comprises stations B1, B2 and B3 at which the components are securely welded together and are then discharged. The stations may be changed in their use. Thus, station A1 may be a carriage-lifting station only—for reasons which are later apparent—station A2 the loading station and station A3 for tack welding. Station A4 remains the transfer station.

In going through lines A and B the floor component moves in the direction of arrow X, locating button *h* being at the trailing end of tunnel *b*.

Referring now to FIG. 4: the skeleton carriage 25 comprises rectangular frame members 26, 27 and headstocks 28 carried by extensions 29 of members 26. Between headstocks 28 and carried laterally outside members 26 are side frames 30. The headstocks 28 carry coupling members of which a male member 32 has a T-head to enter a corresponding female member 23 by relative vertical movement, i.e., movement normal to the plane of carriage 25. For convenience the headstock 28 carrying member 32 is called the male headstock and the other is the female headstock.

The male headstock has at each end a set of rollers 33 to engage a rail 34 (see FIGS. 3, 5 and 8) at each side of the apparatus. Each side frame 30 carries a similar set of rollers 31 to engage rails 34. The carriage 25 runs horizontally along rails 34 upon rollers 31, 33. The rollers are so constructed and arranged that the carriage is accurately positioned vertically and sideways, as is evident from FIG. 8.

Rails 34 extend each in one piece through central stations A2 and A3. The rails at end stations A1 and A4 are separate from the central rail portions. End rail 34 of station A1 is mounted on a table 35 supported from a base frame 36 (see FIG. 5) by a pair of cross links 37, 38—one pair at each side of the table. Links 37, 38 are pivoted respectively to table 35 and frame 36 at 39, 40 and the links slide along slotted guides 41, 42 respectively. A hydraulic motor or jack 43 connected between frame 36 and the links (see FIG. 1) is provided to open and close the links and thus to raise and lower the table. When the table is fully raised, end rail section 34 thereon is accurately in line with the central rail section extending fixedly through stations A2 and A3. Carriage 25 can therefore be run off the table 35 into station A2.

The carriage 25 is accurately positioned and held against movement as the table is raised in the following manner—see particularly FIGS. 5, 6 and 7. Near the outer extremity of the end rail section for station A1 (i.e., the end remote from station A2) there is an upstanding abutment 44 which is raised and lowered with the rail. The crosshead 45 of coupling member 32 abuts the member 44. A bell crank lever 46 is pivoted at 47 and urged by spring 48 to engage behind the crosshead 45—as shown chain dotted in FIG. 5. The lever assembly is carried up and down with table 35 by arm 50. The lever holds the crosshead 45 against abutment 44 so that the carriage is accurately positioned and held against horizontal movement along rail 34. A little before the uppermost position of table 35 lever 46 engages a fixed bracket 49 and is held against movement as the crosshead 45 continues upwardly. The crosshead is thus released, and the carriage is able to move along rails 34 insofar as lever 46 is concerned.

While carriage 25 on table 35 is being raised another carriage is at station A2. This carriage is accurately positioned at A2 as later described. Suffice that the female coupling 23 of the carriage on table 35 is aligned with coupling 32 of the carriage at station A2 so that the couplings inter-engage as the table is raised. Members 44, 46 ensure accurate location for this purpose. Thus, when the table is fully raised the carriages at stations A1 and A2 are coupled together.

It is required that the carriages be coupled together without looseness in the direction of travel and this is achieved by the devices of FIG. 13. Each crosshead 28 carries a pair of spaced, inclined face plates 51 each of which has a wedge block 52 secured thereto by bolts 53. The bolts when released are movable along slots 54 in plates 51 and blocks 52 are thereby adjusted crosswise of the carriage. Thus the lengthwise position of each wedge block is accurately variable. All the faces of crosshead 45 and the internal faces of member 23 are convex so that as the members are coupled together by raising table 35 the convex faces come together with reduced clearance between them. Thus the members are guided one into the other with ample clearance and the clearance is reduced. By adjustment of blocks 52 the clearance between the convex faces of the members 23, 45 is substantially eliminated upon coupling the carriages.

The crosshead 45 (FIG. 14) is secured to the shank 55 of member 32 by a stud 56 which enables the head 45 to be pivoted. When head 45 is turned through 90° from the position of FIG. 13 it will pass through the opening 57 of member 23 (see also FIG. 4) and the carriages can then be uncoupled. The head 45 is held against pivotal movement by pin 58 which is urged by spring 59 to enter a hole 60 in the head. Pin 58 is manually retractable by finger piece 61. The uncoupling operation is manually performed when setting up the apparatus or during failure of the apparatus or for adjustment thereof.

Consider now FIGS. 15 and 16. This shows the apparatus at station A2 with a carriage 25 coupled to a carriage which is on table 35, the carriages being coupled when the table is raised as described above. Similarly the carriage at station A2 is coupled to a carriage at station A3. The mechanism for driving the carriages is at station A2 and is shown in FIGS. 15 and 16. It is to be understood that the carriages are moved in succession through stations A1, A2, A3 and A4 at the level of table 35 when in its raised position and that the carriages are returned in succession through stations A4, A3, A2 and A1 at a lower level as shown in FIGS. 15 and 16. A driving mechanism is provided for the carriages at the upper and lower levels. The mechanism for the upper level will now be described.

The base frame 36 has upstanding pillars 62 which carry rails 34 at the upper and lower levels. These rails are fixed. Immediately beneath the upper rails is a sub-frame 63 secured to pillars 62. Frame 63 supports a rotary motor (e.g., a hydraulic motor) 64 which drives a pair of pulleys 65 through gear box 66. The pulleys 65 are faced with friction, driving material 67 (FIG. 16) each to engage a plate 68 secured beneath members 26 of carriage 25 (see also FIG. 4). The motor, gear box and pulleys are mounted on a base 69 which is pivoted at 70 to frame 63 for rising and falling movement. The base 69 has sprung feet 71 to rest upon frame 63, the feet being at the free (i.e., non-pivoted) end of base 69. The free end is also pivotally connected to frame 63 by a reciprocating hydraulic motor or jack 72. The jack 72 pivots base 69 on frame 63 to raise the driving mechanism so that pulleys 65 drivingly engage plates 68. While motor 64 is in operation carriage 25 is moved forward by actuating jack 72 to engage the rotating pulleys 65 with plates 68.

The moving carriages have considerable inertia and it is necessary that they be gradually slowed down as they complete their travel to the next station. Accordingly each carriage has an inclined plate 73 which is moved past a hydraulic valve 74 fixed by bracket 75 to frame 63 thereby to actuate the valve. Towards the end of its travel from station A1 to station A2 valve 74 is actuated to control motor 64 whereby the motor is slowed down so that the coupled carriages at the upper level are decelerated. Finally jack 72 is actuated to lower base 69 thereby rapidly to stop the drive to the carriages. At this time another reciprocating motor or jack 76 is actuated to raise a tapered finger 77 to enter a cup 78 carried by bracket 79 from carriage 25 (see also FIGS. 4 and 9). Finger 77 and cup 78 accurately locate carriage 25 at station A2 thus ensuring coupling of the carriages at stations A1, A2 as table 35 is raised.

A locating finger 77 is provided also at station A3 as shown in FIG. 15.

At station A2 the carriages 25 at the lower level are similarly driven by a motor 64 on base 69 which is pivoted to frame 36. A locating jack 76 and a valve 74 are also provided. As the carriages are moving in opposite directions at the upper and lower levels plates 73 are inclined in opposite directions.

The apparatus at the transfer station A4 is shown in FIGS. 17, 18 and 19 and this will now be described.

A tower frame 80 has a platform 81 upon which is mounted a rotary hydraulic motor 82 (see FIG. 3) to drive shaft 83 and crank 84, one at each end of the shaft. Each crank is coupled to a lifting frame 85 by a connecting rod 86. A weight 871 is provided to balance the reciprocating masses.

Each frame 85 (see FIG. 18) is guided by an upright 87 for vertical reciprocating movement, rollers 88 being interposed between frame 85 and the upright. Each frame 85 has arms 89 to overlie the ends of side frames 30. The floor assembly of FIGS. 1 and 2 is held on carriage 25 as later described in detail. Suffice to say that at station A4 the assembly may be lifted off the carriage. For convenience the assembly is indicated in FIGS. 17, 18 and 19 simply by the reference letter a.

At station A4 there is a table and lifting gear therefor as described above with respect to station A1 (FIGS. 1 and 5). This is shown in FIG. 17, like reference numerals indicating like parts. When the table 35 is in its uppermost position at station A4 a carriage 25 is moved on to it, along rails 34, from station A3. At this time lifting frame 85 is at the bottom of its travel (FIG. 17) and arms 89 are about the same level as rails 34, i.e., slightly beneath the level of carriage 25. The plan outline of the floor assembly a is shown dotted in FIG. 18 and it will be seen that arms 89 can pass within the recesses of the carriage to engage beneath the assembly. This is done while carriage 25 is at station A4 and after frames 85 have commenced their lifting movement. Thereafter with continued upward movement of frames 85 the floor assembly a is lifted off carriage 25 to the uppermost position shown chain dotted in FIG. 17. The carriage 35 at station A4 is lowered after the assembly a has been removed from it to bring the carriage into alignment with the lower rails 34. As this occurs the coupling 23, 32 of the carriages at the upper level is disconnected and the coupling at the lower level is made. Thus, when the lower driving mechanism is operated the carriage at station A4 is moved to station A3.

Both tables 35 are raised and lowered at the same time. When the tables are in their upper position the driving mechanism for the upper carriages is operated and the lower driving mechanism in inoperative and when the tables are in their lower position the upper mechanism is inoperative and the lower mechanism is operated.

When carriage 25 is moved on to table 35 at station A4 it is accurately located by engagement of member 23 with an abutment 90 (FIG. 17) carried on arm 91 from the table. A spring catch 92 is moved aside by member 23 as it advances to abutment 90 and the catch then springs to behind member 23 as shown chain dotted in FIG. 17. When the table at station A4 is in its lower position the catch 92 engages a stationary stop 93 supported from frame 36 to release member 23. The carriage can then be returned from station A4 to station A3.

Referring now to FIG. 22. The line B comprises for each station B1, B2 and B3 an overhead frame 94 from which the welding equipment (generally indicated at 95) is supported. A reciprocating hydraulic motor or jack 96 (see FIG. 20) raises and lowers a cradle 97 upon which the floor assembly a rests and the assembly can thus be lifted into working position with respect to equipment 95 The cradle is then lowered to its starting position.

A slide assembly 98 extends from station A4 through stations B1, B2 and B3. The slide is reciprocated from this limiting position to the right by a reciprocating hydraulic motor or jack 99 (carried by frames 94 and coupled to the slide by bracket 100) until the slide reaches its other limiting position at which it extends through stations B1, B2, B3 and B4. The latter is an unloading station, the complete fabricated floor assembly a being discharged at station B4 from line B. Slide assembly 98 reciprocates between the two limiting positions referred to. After the assembly 98 is brought to station A4 the frames 85 are lowered from their uppermost position (FIG. 17) at which assembly a is above slide 98 and consequently the assembly is laid upon the slide and is then supported by the slide as later described. The assembly a in this lowered position is also shown chain dotted in FIG. 17 slightly beneath the shewing of the assembly in its uppermost position.

The assembly 98 comprises a pair of spaced beams 101 each supported on rollers 102 carried by brackets 103 from a stringer 104 secured to frames 94, the beams 101 being suitably connected by cross members 131 (FIG. 19). The cradles 97 lie between the beams 101.

Stations A4, B1, B2, B3 and B4 are equi-spaced and assembly 98 reciprocates by the distance between any pair of adjacent stations. When the cradles 97 are in their lower position (so that the assemblies a are on the assembly 98 and are equi-spaced therealong) and assembly 98 is reciprocated to the right from the position of FIG. 22 the assembly a at station A4 is brought to station B1, the assembly at B1 is simultaneously brought to B2 and so on. Thereafter all the jacks 96 are actuated to raise the cradles and the assemblies a thereon and a welding operation is performed on the assemblies a by equipment 95 simultaneously at each station B1, B2 and B3. At the same time a floor assembly is off-loaded at B4. While the assemblies are raised the assembly 98 is returned to the position of FIG. 22. The cradles are then lowered and assemblies a thus placed on the slide 98. At the same time a floor assembly is placed on the slide 98 at station A4. The sequence just detailed is then repeated. Thus, the assemblies a at each station A4, B1, B2, B3 and B4 are simultaneously moved forward step-by-step by slide 98, the assemblies a at B1, B2, B3 and B4 are all raised and lowered together and finally the welding operations at B1, B2 and B3, transfer from line A to line B and off-loading at B4 are all performed at the same time. Thus, the components of a single assembly a are successively welded together so that each station B1, B2 and B3 carries, in the main, only the equipment needed for the particular operation involved and it is the sum of the equipment at these stations which represents the full equipment required for fabrication of the floor assembly.

The various hydraulic motors or jacks, the welding equipment and so on are interconnected and controlled so that the several operations are synchronised. More particularly movement both horizontally and vertically of carriages 25, vertical movement of frames 85 and horizontal movement of slide 98 are co-ordinated so that the assemblies *a* are transferred automatically from line A to line B. With the arrangement described the components of assembly *a* when placed on a carriage 25 are moved automatically to the unloading station and the fabricating operations are all performed automatically. For effective operation of the apparatus it is necessary that the components of assembly *a* be accurately located on carriages 25, cradles 97 and slide 98 in a predetermined position and that when each assembly is transferred from the carriages to the slide and also from the slide to the cradle and vice versa the assembly be accurately positioned in required position after each transfer.

The carriage 25 (FIG. 4) is provided with a conic stud 105 and with two pairs of oppositely arranged blocks 106, each pair being on one of the extensions 29 of frame members 26. The inner faces 107 of each pair of blocks are upwardly divergent to a small extent. The panel *a* of FIG. 1 is placed on the carriage 25 by an operator so that stud 105 enters the button *h* from beneath the panel as viewed in FIG. 1—see also FIG. 10. The stud 105 and button *h* are made to interfit accurately. The stud locates the panel accurately in relation to the carriage lengthwise and crosswise thereof but does not prevent rotation of the panel. The edges *i* of the latter are accurately produced and enter between the pairs of blocks 106 to engage faces 107 thereof. The blocks hold the panel *a* against rotation. Thus stud 105 and blocks 106 enable panel *a* readily to be placed on carriage 25 and they accurately position the panel thereon. The panel rests upon shoes 120 suitably positioned upon carriage 25 (see FIGS. 4 and 11) to ensure support for the panel.

FIG. 11 shows the detail construction of a spring catch which may be incorporated on a carriage for special panel shapes to hold down a panel on the carriage. Such catch comprises a detent plate 121 pivoted at 122 to bracket 123 and urged about the pivot into a panel-engaging position by a coil compression spring 124. The detent would engage over the end edge of a side *c* of the panel. It will be seen from the positioning of this catch 121 in FIG. 4 that such end of the panel would not then be squared as otherwise described, but would have cut-away corners with inset edges of which the catches 121 would coincide. The spring force would be simply overcome by the force applied in automatically lifting the panel off the carriage as described.

At each of stations B1, B2 and B3 the cradle 97 is provided with an upstanding foot 108 (FIG. 20) carrying a stud 109 and is also provided with brackets 110 having inclined faces 111. Stud 109 and faces 111 correspond with stud 105 and faces 107 respectively and accurately locate the panel *a* on the cradle.

Any slight mis-positioning of panel *a* on carriage 25 or cradle 97 is corrected by the inclined faces 107 and 111 and by the conic form of button *h* and the sloping formation of studs 105 and 109.

The panel assembly is held down on the cradle by a clamp 112 (FIGS. 20, 21) which is urged downwardly by springs 113, the clamp being engaged by tunnel *b* as the cradle is raised. The clamp depends from frame 94. A backing-up block 114 on cradle 97 supports tunnel *b* beneath clamp 112.

The assembly *a* must also be held down on carriage 25. This will now be described. Reverting to FIG. 3. The operator places panel *a* on carriage 25 at station A1 and is enabled to place the other components *d, e, f* and *g* upon the panel at stations A1, A2 and while the carriage moves from station A1 to A3. Hand welding equipment (not shown) is available to the operator and components *f* and *g* are tack welded to tunnel *b* by the operator with this equipment. Strips *d* are placed on panel *a* and must be located along their length before tack welding. At station A2 three clamps 115 are spaced along a frame 116 which lies beside each of rails 34 (FIG. 8). When the operator positions a strip *d* properly on panel *a* clamps 115 are operated to hold the strips, the panel and the strips being supported by blocks 117, 118. Blocks 117 are removable. Each clamp 115 and its associated block 117 is actuated by the reciprocating hydraulic motor or jack 119. While strips *d* are clamped as described they are tack welded by the operator to panel *a* and the clamps 115 are released, the assembly *a* remaining on its carriage—see FIG. 12.

The carriage takes the assembly *a* after tack welding by the operator to station A3. The carriage passes beneath a canopy 125 (FIG. 3) supported on legs 126. Welding equipment 127 is suspended from canopy 125. The equipment is lowered to working position to tack weld the components sufficiently to enable them to be handled at the subsequent stations. The equipment 127 presses upon the components and holds them down on carriage 25. After tack welding at station A3 the equipment is raised and the carriage 25 advanced to station A4.

The assembly *a* must be transferred at station A4 to assembly 98 with sufficient accuracy as to ensure that it will be positioned by stud 109 and faces 111 of cradle 97 at station B1. The arms 89 (FIGS. 17 and 18) have L-section hands 128 to engage the edges *i* of the floor assembly for positioning the panel on frame 85 in the direction of travel X. It is in this direction that misalignment of the panel in relation to the transfer from carriage 25 to lifting frame 85 is most likely to occur the possibility of transverse misalignment being very much less. When assembly *a* is lowered on to slide assembly 98 it is placed upon inwardly-directed arms 129 (FIG. 18) carried by slides 101 (three arms on each slide for every station A4, B1, B2 and B3). The assembly *a* is lifted off each cradle 97—as the latter is lowered—by arms 129 and is advanced to the next station by slide assembly 98 by these arms, the arms having wedge-shaped blocks 130 (FIG. 19) to engage behind the edge of panel *a* and of sides *c*.

The carriages 25 move along two parallel, horizontal paths but this is not necessary. The lower path (see FIG. 3) is in a pit 132.

The main advantages of the apparatus are:

(i) The fixtures and welding equipment at each station are only such as required for the fabrication at the station so that the cost of installation and maintenance is low, (ii) The carriages are utilised to the minimum extent so that the cost of installation is kept low since the cost of this part of the apparatus is relatively high—more especially if a pit is used for the carriages, (iii) The use of carriages in line A enables hand work readily to be done, including manual tack welding while the carriages are moving, (iv) After preliminary assembly with tack welding the floor structure is fabricated automatically in the second assembly line B, (v) The tack welding operations performed manually by the operator are not limited by considerations of design of the apparatus, the components being accessible from both sides and from above, and (vi) A single operator or one or two at each side of the component may, as required, be accommodated for tack welding.

The off-loading mechanism at station B is not described in detail. This may be of any known or convenient construction though in FIG. 22 it comprises sloping rails 135 down which the completed floor assembly *a* is slid sideways on to a belt conveyor 136.

I claim:

1. Welding apparatus comprising a plurality of individual carriages, a loading station at which components are received by each carriage in succession, at least one station at which components on each carriage are tack-welded into an assembly, a transfer station, means to deliver the loaded carriages from said loading station through said tack-welding station to said transfer station, a plurality of stations locating welding means to permanently unite the components of each assembly, an unloading station, a slide conveyor reciprocable between said transfer and unloading stations through said permanent-welding stations, means at said transfer station to off-load from each carriage in succession its tack-welded assembly and transfer said assembly to said slide conveyor, means at each permanent-welding station to remove an assembly from said slide conveyor into engagement with said welding means and thence return such assembly to the slide conveyor, means to return the unladen carriages in succession from said transfer station to said loading station, said carriages and delivery and return means constituting an endless conveyor, and control means to co-ordinate the operation of said endless and slide conveyors to advance a succession of assemblies simultaneously from one of said stations to the next.

2. Apparatus according to claim 1 wherein said off-loading and transfer means at said transfer station is arranged to lift an assembly from its carriage to a level above said slide conveyor while the latter is remote from said transfer station and thereafter to lower such assembly onto said slide conveyor when the latter is returned to said transfer station.

3. Apparatus according to claim 2 wherein said off-loading and transfer means at said transfer station is arranged to lift an assembly from its carriage to said level above said slide conveyor simultaneously with the operation of said means at each permanent-welding station to remove an assembly from said slide conveyor.

4. Apparatus according to claim 2 wherein said off-loading and transfer means at said transfer station includes a lift slidable reciprocably, in synchronism with said endless and slide conveyors, between a position beneath that of a laden carriage at said transfer station and a position at the said level above said slide conveyor.

5. Apparatus according to claim 2 wherein said carriages move in two horizontal paths one above the other between said loading and transfer stations and below the level of said slide conveyor, and said carriage delivery and return means includes means at said transfer station to lower carriages, after unloading, from the higher to the lower path and another means at said loading station to raise the unladen carriages from the lower to the higher path.

6. Apparatus according to claim 1 wherein each carriage comprises aligning and locating means to set an assembly of components in a predetermined position on the carriage, said off-loading and transfer means at said transfer station is arranged to maintain the assembly in similar position, and aligning means on said slide conveyor is adapted to receive and similarly set the assembly on said slide conveyor.

7. Apparatus according to claim 6 wherein at each permanent-welding station there is associated with said slide conveyor a cradle and means to raise said cradle to lift an assembly from said slide conveyor into engagement with the welding means, said cradle comprising aligning and locating means to set an assembly in predetermined position on the cradle.

8. Apparatus according to claim 7 wherein said aligning and locating means on each carriage and cradle includes a formation on each carriage and cradle adapted to inter-engage with a complementary formation on each assembly and inclined faces to guide such formations into inter-engagement.

9. Apparatus according to claim 5 wherein said carriages are adapted to be interconnected in said horizontal paths automatically by said carriage lowering and raising means.

References Cited in the file of this patent
UNITED STATES PATENTS

| | | |
|---|---|---|
| 1,869,804 | Eksergian | Aug. 2, 1932 |
| 2,159,860 | Platz | May 23, 1939 |
| 2,244,006 | Harrington | June 3, 1941 |
| 2,293,169 | Platz | Aug. 18, 1942 |